United States Patent
Seo et al.

(10) Patent No.: US 11,702,485 B2
(45) Date of Patent: Jul. 18, 2023

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Kyung Chang Seo, Daejeon (KR); Yu Jin Kim, Daejeon (KR); Youk Reol Na, Daejeon (KR); No Ma Kim, Daejeon (KR)

(73) Assignee: LG Chem, Ltd.

( * ) Notice: Subject to any disclaimer, the term of this patent is extended or adjusted under 35 U.S.C. 154(b) by 32 days.

(21) Appl. No.: 16/963,407

(22) PCT Filed: May 8, 2019

(86) PCT No.: PCT/KR2019/005504
§ 371 (c)(1),
(2) Date: Jul. 20, 2020

(87) PCT Pub. No.: WO2019/216645
PCT Pub. Date: Nov. 14, 2019

(65) Prior Publication Data
US 2021/0179741 A1    Jun. 17, 2021

(30) Foreign Application Priority Data
May 8, 2018    (KR) .................. 10-2018-0052383

(51) Int. Cl.
| C08C 19/22 | (2006.01) |
| C08C 19/25 | (2006.01) |
| C08C 19/44 | (2006.01) |
| B60C 1/00 | (2006.01) |
| C08F 236/06 | (2006.01) |
| C08K 3/04 | (2006.01) |
| C08K 3/36 | (2006.01) |

(52) U.S. Cl.
CPC .............. *C08C 19/22* (2013.01); *C08C 19/25* (2013.01); *C08C 19/44* (2013.01); *C08F 236/06* (2013.01); *C08K 3/04* (2013.01); *C08K 3/36* (2013.01); *B60C 1/00* (2013.01)

(58) Field of Classification Search
CPC .......... B60C 1/00; C08C 19/22; C08C 19/25; C08C 19/44; C08F 236/06; C08K 3/04; C08K 3/36
USPC ....................................................... 524/548
See application file for complete search history.

(56) References Cited

U.S. PATENT DOCUMENTS

| 4,397,994 | A | 8/1983 | Takeuchi et al. |
| 7,968,652 | B2 | 6/2011 | Kurazumi et al. |
| 8,410,224 | B2 | 4/2013 | Matsumoto et al. |
| 9,175,124 | B2 | 11/2015 | Chaboche et al. |
| 2004/0254301 | A1 | 12/2004 | Tsukimawashi et al. |
| 2009/0111933 | A1 | 4/2009 | Yamada et al. |
| 2009/0292043 | A1 | 11/2009 | Kurazumi et al. |
| 2010/0113683 | A1 | 5/2010 | Matsumoto et al. |
| 2010/0160530 | A1 | 6/2010 | Kurazumi et al. |
| 2011/0178233 | A1 | 7/2011 | Chaboche et al. |
| 2013/0085228 | A1 | 4/2013 | Tanaka et al. |
| 2016/0355612 | A1 | 12/2016 | Chun et al. |
| 2018/0112015 | A1 | 4/2018 | Mun et al. |
| 2018/0258194 | A1 | 9/2018 | Sohn et al. |
| 2019/0153124 | A1 | 5/2019 | Seo et al. |

FOREIGN PATENT DOCUMENTS

| CN | 104271609 A | | 1/2015 |
| EA | 020173 B1 | | 9/2014 |
| JP | 2015054905 A | | 3/2015 |
| JP | 2015054905 A | * | 3/2015 |
| KR | 20040053144 A | * | 6/2004 |
| KR | 20130059360 A | | 6/2013 |
| KR | 20150144130 A | | 12/2015 |
| KR | 20160062950 A | | 6/2016 |
| KR | 20160067489 A | * | 6/2016 |
| KR | 20170077773 A | | 7/2017 |
| KR | 20170121694 A | | 11/2017 |
| KR | 20180018175 A | | 2/2018 |
| RU | 2009139078 A | | 4/2011 |
| RU | 2425845 C2 | | 8/2011 |
| RU | 2431644 C2 | | 10/2011 |

OTHER PUBLICATIONS

International Search Report for Application No. PCT/KR2019/005504 dated Aug. 14, 2019, 2 pages.
Extended European Search Report including Written Opinion for Application No. 19800058.0 dated Feb. 9, 2021, 7 pages.
Usmanov, T.S. et al., "Inverse problems of formation for the molecular-weight distribution in polymerization processes", Computational Methods and Programming, Oct. 24, 2006, pp. 294-299, vol. 7.
Search Report dated Sep. 2, 2022 from Office Action for Chinese Application No. 201980009619 dated Sep. 7, 2022. 2 pgs.

* cited by examiner

*Primary Examiner* — Kelechi C Egwim
(74) *Attorney, Agent, or Firm* — Lerner David LLP

(57) ABSTRACT

A modified conjugated diene-based polymer and a rubber composition including the same are disclosed herein. In some embodiments, the modified conjugated diene-based polymer includes a modified monomer-derived functional group represented by Formula 1, and an aminoalkoxysilane-based modifier-derived functional group at least one end thereof, wherein the polymer having a unimodal molecular weight distribution, and a polydispersity index (PDI) of 1.0 or more to less than 1.7. The polymer has a narrow and unimodal molecular weight distribution, and has excellent tensile properties and viscoelastic properties while having excellent processability.

11 Claims, 2 Drawing Sheets

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2019/005504, filed on May 8, 2019, which claims priority from Korean Patent Application No. 10-2018-0052383, filed on May 8, 2018, the disclosures of which are incorporated by reference herein.

TECHNICAL FIELD

The present invention relates to a modified conjugated diene-based polymer having excellent tensile strength and viscoelastic properties while having excellent processability and a rubber composition including the same.

BACKGROUND ART

In line with the recent demand for fuel-efficient cars, a conjugated diene-based polymer having adjustment stability represented by wet road surface resistance as well as low rolling resistance and excellent abrasion resistance and tensile properties is required as a rubber material for a tire.

In order to reduce the rolling resistance of a tire, there is a method of reducing a hysteresis loss of a vulcanized rubber, and rebound resilience at 50° C. to 80° C., tan δ, or Goodrich heat generation is used as an evaluation index of the vulcanized rubber. That is, it is desirable to use a rubber material having high rebound resilience at the above temperature or low tan δ or Goodrich heat generation.

A natural rubber, a polyisoprene rubber, or a polybutadiene rubber is known as a rubber material having a low hysteresis loss, but these rubbers may have low wet road surface resistance. Thus, recently, a conjugated diene-based polymer or copolymer, such as a styrene-butadiene rubber (hereinafter, referred to as "SBR") or a butadiene rubber (hereinafter, referred to as "BR"), is prepared by emulsion polymerization or solution polymerization to be used as a rubber for a tire. Among these polymerizations, the greatest advantage of the solution polymerization in comparison to the emulsion polymerization is that a vinyl structure content and a styrene content, which specify physical properties of the rubber, may be arbitrarily adjusted and its molecular weight and physical properties may be controlled by coupling or modification. Thus, the SBR prepared by the solution polymerization is widely used as a rubber material for a tire because it is easy to change a structure of the finally prepared SBR or BR, and movement of chain ends may be reduced and a coupling force with a filler, such as silica or carbon black, may be increased by coupling or modification of the chain ends.

In a case in which the solution-polymerized SBR is used as the rubber material for a tire, since a glass transition temperature of the rubber is increased by increasing a vinyl content in the SBR, physical properties, such as running resistance and braking force, required for a tire may not only be controlled, but fuel consumption may also be reduced by appropriately adjusting the glass transition temperature. The solution-polymerized SBR is prepared by using an anionic polymerization initiator, and is being used by coupling or modification of chain ends of the formed polymer using various modifiers. For example, U.S. Pat. No. 4,397,994 discloses a technique in which active anions at chain ends of a polymer, which is obtained by polymerization of styrene-butadiene in a non-polar solvent using alkyllithium as a monofunctional initiator, are bonded by using a binder such as a tin compound.

The polymerization of the SBR or BR may be performed by batch or continuous polymerization, wherein, with respect to the batch polymerization, it is advantageous in terms of improving physical properties due to a narrow molecular weight distribution of a prepared polymer, but productivity may be low and processability may be poor, and, with respect to the continuous polymerization, productivity is excellent because the polymerization is continuously performed, and it is advantageous in terms of improving processability, but physical properties are poor due to a wide molecular weight distribution. Thus, there is a continuing need for research to improve productivity, processability, and physical properties at the same time during the preparation of the SBR or BR.

PRIOR ART DOCUMENT (Patent Document 1) U.S. Pat. No. 4,397,994 A

DISCLOSURE OF THE INVENTION

Technical Problem

The present invention provides a modified conjugated diene-based polymer having excellent physical properties, such as tensile properties, and viscoelastic properties as well as excellent processability by being prepared by continuous polymerization and a rubber composition including the same.

Technical Solution

According to an aspect of the present invention, there is provided a modified conjugated diene-based polymer having a unimodal molecular weight distribution, as indicated by a unimodal-shaped molecular weight distribution curve obtained by gel permeation chromatography (GPC), and a polydispersity index (PDI) of 1.0 or more to less than 1.7, wherein the modified conjugated diene-based polymer includes a modified monomer-derived functional group represented by Formula 1, and includes an aminoalkoxysilane-based modifier-derived functional group at least one end thereof:

$$F_1\text{—}R_1 \qquad \text{[Formula 1]}$$

in Formula 1, $F_1$ is an amine-containing functional group, and $R_1$ is an alkenyl group having 2 to 10 carbon atoms.

According to another aspect of the present invention, there is provided a rubber composition including the modified conjugated diene-based polymer and a filler.

Advantageous Effects

A modified conjugated diene-based polymer according to the present invention may have a narrow molecular weight distribution as defined by a polydispersity index of less than 1.7 while having a unimodal molecular weight distribution as indicated by a unimodal-shaped molecular weight distribution curve obtained by gel permeation chromatography and may have excellent tensile properties and viscoelastic properties while having excellent processability.

Also, since the modified conjugated diene-based polymer according to the present invention includes a modified monomer-derived functional group and includes a modifier-derived functional group at least one end thereof, the tensile properties and viscoelastic properties may be further improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
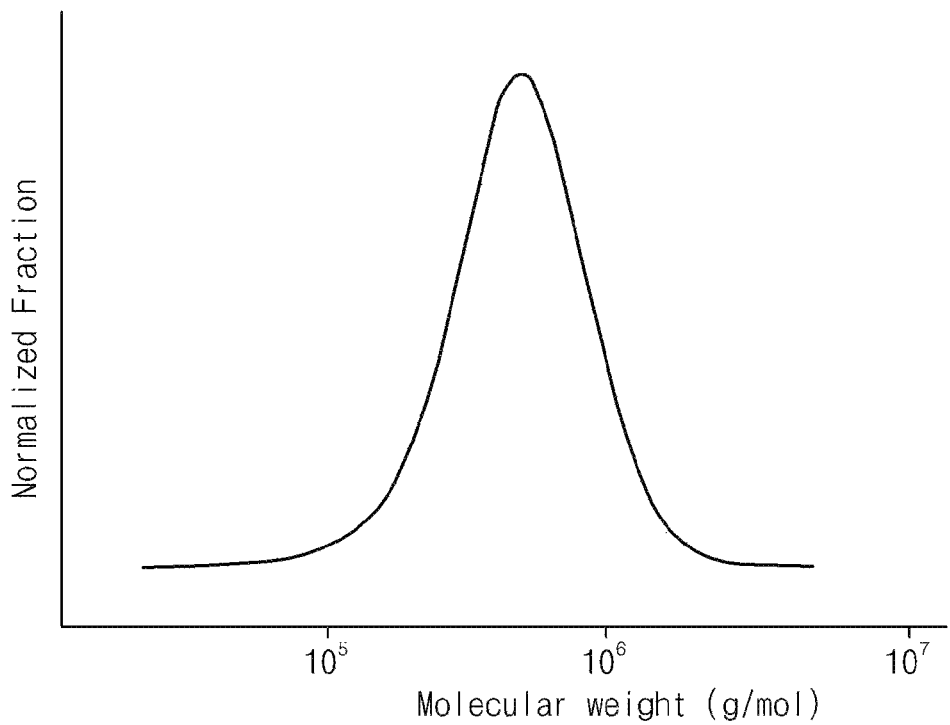
FIG. 1 illustrates a molecular weight distribution curve of a modified conjugated diene-based polymer of Example 1 according to an embodiment of the present invention by gel permeation chromatography (GPC)

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "substituted" in the present invention may mean that the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogens present in the functional group, the atomic group or the compound, and if a plurality of substituents are present, each substituent may be the same or different.

The term "alkyl group" in the present invention may mean monovalent aliphatic saturated hydrocarbon, and may include linear alkyl group such as methyl, ethyl, propyl and butyl; branched alkyl group such as isopropyl, sec-butyl, tert-butyl and neo-pentyl; and cyclic saturated hydrocarbons, or cyclic unsaturated hydrocarbons containing one or two or more unsaturated bonds.

The term "alkylene group" in the present invention may mean bivalent aliphatic saturated hydrocarbon such as methylene, ethylene, propylene, and butylene.

The term "cycloalkyl group" in the present invention may mean cyclic saturated hydrocarbon.

The term "aryl group" in the present invention may mean cyclic aromatic hydrocarbon, and may include both monocyclic aromatic hydrocarbon, in which one ring is formed, and polycyclic aromatic hydrocarbon in which two or more rings are combined.

The term "heterocyclic group" in the present invention means cyclic saturated hydrocarbon or cyclic unsaturated hydrocarbon containing at least one unsaturated bond, in which a carbon atom in the hydrocarbon may be substituted with one or more heteroatoms, wherein the heteroatom may be selected from nitrogen (N), oxygen (O), and sulfur (S).

The term "monovalent hydrocarbon group" in the present invention denotes a monovalent substituent derived from a hydrocarbon group, wherein, for example, the monovalent hydrocarbon group may denote a monovalent atomic group in which carbon and hydrogen are bonded, such as an alkyl group, an alkenyl group, an alkynyl group, a cycloalkyl group, a cycloalkyl group containing at least one unsaturated bond, and an aryl group, and the monovalent atomic group may have a linear or branched structure depending on its bonding structure.

The term "divalent hydrocarbon group" in the present invention denotes a divalent substituent derived from a hydrocarbon group, wherein, for example, the divalent hydrocarbon group may denote a divalent atomic group in which carbon and hydrogen are bonded, such as an alkylene group, an alkenylene group, an alkynylene group, a cycloalkylene group, a cycloalkylene group containing at least one unsaturated bond, and an arylene group, and the divalent atomic group may have a linear or branched structure depending on its bonding structure.

The term "single bond" in the present invention may mean a single covalent bond itself, which does not include a separate atomic or molecular group.

The terms "derived unit" and "derived functional group" in the present invention may mean a component or structure generated from a certain material or may mean the material itself.

The present invention provides a modified conjugated diene-based polymer having excellent tensile properties and viscoelastic properties while having excellent processability.

The modified conjugated diene-based polymer according to an embodiment of the present invention has a unimodal molecular weight distribution as indicated by a unimodal-shaped molecular weight distribution curve obtained by gel permeation chromatography (GPC) and a polydispersity index (PDI) of 1.0 or more to less than 1.7, wherein the modified conjugated diene-based polymer includes a modified monomer-derived functional group represented by Formula 1, and includes an aminoalkoxysilane-based modifier-derived functional group at least one end thereof.

$$F_1 - R_1 \quad \text{[Formula 1]}$$

In Formula 1, $F_1$ is an amine-containing functional group, and $R_1$ is an alkenyl group having 2 to 10 carbon atoms.

According to an embodiment of the present invention, the modified conjugated diene-based polymer may include a conjugated diene-based monomer-derived repeating unit, a modified monomer-derived functional group, and a modifier-derived functional group. The conjugated diene-based monomer-derived repeating unit may denote a repeating unit formed by polymerization of a conjugated diene-based monomer, and the modified monomer-derived functional group and the modifier-derived functional group may denote a functional group derived from a modified monomer present in a polymer chain and a functional group derived from a modifier, respectively.

Also, the modified monomer-derived functional group may be present in a polymer chain or may be present at least one end of the polymer chain, and, in a case in which the modified monomer-derived functional group is present at one end of the polymer chain, the modified monomer-derived functional group may be present at one end of the polymer chain and the modifier-derived functional group may be present at the other end of the polymer chain. That is, in this case, the modified conjugated diene-based polymer according to the embodiment of the present invention may be a both-ends-modified conjugated diene-based polymer having both ends modified.

Also, according to another embodiment of the present invention, the modified conjugated diene-based polymer may be a copolymer including a conjugated diene-based monomer-derived repeating unit, an aromatic vinyl-based monomer-derived repeating unit, a modified monomer-derived functional group, and a modifier-derived functional group. Herein, the aromatic vinyl monomer-derived repeating unit may denote a repeating unit formed by polymerization of an aromatic vinyl-based monomer.

According to an embodiment of the present invention, the conjugated diene-based monomer may include at least one selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (the expression "halo" denotes a halogen atom).

The aromatic vinyl-based monomer, for example, may include at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl)styrene), 4-(2-pyrrolidino ethyl) styrene), and 3-(2-pyrrolidino-1-methyl ethyl)styrene.

As another example, the modified conjugated diene-based polymer may be a copolymer further including a repeating unit derived from a diene-based monomer having 1 to carbon atoms, in addition to the conjugated diene-based monomer-derived repeating unit. The diene-based monomer-derived repeating unit may be a repeating unit derived from a diene-based monomer different from the conjugated diene-based monomer, and the diene-based monomer different from the conjugated diene-based monomer, for example, may be 1,2-butadiene. In a case in which the modified conjugated diene-based polymer is the copolymer further including the diene-based monomer, the modified conjugated diene-based polymer may include the diene-based monomer-derived repeating unit in an amount of greater than 0 wt % to 1 wt %, greater than 0 wt % to 0.1 wt %, greater than 0 wt % to 0.01 wt %, or greater than 0 wt % to 0.001 wt %, and there is an effect of preventing gel formation within this range.

According to an embodiment of the present invention, the copolymer may be a random copolymer, and, in this case, a balance between physical properties is excellent. The random copolymer may denote that repeating units constituting the copolymer are disorderly arranged.

The modified conjugated diene-based polymer according to the embodiment of the present invention may have a number-average molecular weight (Mn) of 1,000 g/mol to 2,000,000 g/mol, 10,000 g/mol to 1,000,000 g/mol, or 100,000 g/mol to 800,000 g/mol, and may have a weight-average molecular weight (Mw) of 1,000 g/mol to 3,000,000 g/mol, 10,000 g/mol to 2,000,000 g/mol, or 100,000 g/mol to 2,000,000 g/mol, and may have a peak-average molecular weight (Mp) of 1,000 g/mol to 3,000,000 g/mol, 10,000 g/mol to 2,000,000 g/mol, or 100,000 g/mol to 2,000,000 g/mol. Rolling resistance and wet road surface resistance are excellent within this range. As another example, the modified conjugated diene-based polymer may have a polydispersity index (PDI; Mw/Mn) of 1.0 or more to less than 1.7, or 1.1 or more to less than 1.7, wherein the tensile properties and viscoelastic properties are excellent and the balance between physical properties is excellent within this range. At the same time, the modified conjugated diene-based polymer has a unimodal molecular weight distribution, as indicated by a unimodal-shaped molecular weight distribution curve by gel permeation chromatography (GPC), wherein this is a molecular weight distribution appearing in a polymer polymerized by continuous polymerization, and may denote that the modified conjugated diene-based polymer has uniform properties. That is, since the modified conjugated diene-based polymer according to the embodiment of the present invention is prepared by continuous polymerization, the modified conjugated diene-based polymer may have a polydispersity index of 1.0 or more to less than 1.7 while having the unimodal molecular weight distribution.

In general, in a case in which a conjugated diene-based polymer is prepared by batch polymerization and is subjected to a modification reaction, the prepared conjugated diene-based polymer has a multimodal (bimodal or more) molecular weight distribution curve. Specifically, with respect to the batch polymerization, since the polymerization reaction is initiated after all of raw materials are introduced so that growths of chains may simultaneously occur from an initiation point generated by a plurality of initiators, the growth of each chain may be roughly uniform, and, accordingly, molecular weights of the prepared polymer chains are constant so that the molecular weight distribution curve may have a unimodal shape with a very narrow molecular weight distribution. However, in a case in which a modifier is added to perform a modification reaction, two possible cases, a 'case of no modification' and a 'case of modification and coupling', may occur, two groups with a large molecular weight difference between the polymer chains may be formed accordingly, and, as a result, a multimodal molecular weight distribution curve is formed in which peaks of the molecular weight distribution curve are two or more. With respect to a continuous polymerization method according to an embodiment of the present invention, since initiation of the reaction and introduction of raw materials are preformed continuously different from the batch polymerization, and times, at which an initiation point, at which the reaction is initiated, is generated, are different, polymerization initiation varies, for example, the polymerization initiation starts from the beginning of the reaction, starts in the middle of the reaction, and starts at the end of the reaction, and thus, polymer chains having various molecular weights are prepared when the polymerization reaction is completed. Accordingly, a specific peak does not appear dominantly in the curve showing the distribution of the molecular weight so that the molecular weight distribution curve, as a single peak, is broad, and, since a molecular weight may be similar to a molecular weight of a chain in which polymerization is initiated at the beginning of the reaction even if a chain, in which polymerization is initiated at the end of the reaction, is coupled, diversity of the molecular weight distribution may be kept the same, and thus, it is common that the unimodal distribution curve is still maintained.

However, even in the case that a polymer is prepared by the batch polymerization and modified, modification conditions may be adjusted to have the unimodal shape, but, in this case, the entire polymer must not be coupled or must be coupled, and, in the other cases, a unimodal molecular weight distribution curve may not be obtained.

Also, in the case that the entire polymer is coupled as the case where the molecular weight distribution curve of the modified conjugated diene-based polymer has a unimodal distribution despite the fact that the modified conjugated diene-based polymer is prepared by the batch polymerization as described above, processability may be poor because only the polymers having the same level of molecular weight are present and mixing properties may be poor because a functional group capable of interacting with a filler, such as silica or carbon black, is reduced due to the coupling. In contrast, in the case that the entire polymer is not coupled, since the functional group at the end of the polymer, which may interact with the filler, such as silica or carbon black, during processing, is more likely to interact with each other than with the filler, a phenomenon that interferes with the interaction with the filler may occur and, accordingly, the processability may be considerably poor. As a result, in the case that the polymer is controlled to have a unimodal molecular weight distribution curve while the polymer is prepared by the batch polymerization, there may be limitations in that the processability and mixing properties of the prepared modified conjugated diene-based polymer are degraded, and, particularly, the processability may be significantly degraded.

Whether or not the modified conjugated diene-based polymer is coupled may be confirmed by a coupling number (C.N), wherein the coupling number is a number that depends on the number of functional groups to which the polymer present in the modifier may be bonded after the modification of the polymer. That is, the coupling number indicates a ratio of a polymer with only one end-modified and no coupling between polymer chains to a polymer with multiple polymer chains coupled to one modifier, wherein the coupling number may have a range of $1 \leq C.N \leq F$, where F denotes the number of functional groups capable of reacting with the active polymer end in the modifier. In other words, a modified conjugated diene-based polymer with a coupling number of 1 denotes that all of the polymer chains are not coupled, and a modified conjugated diene-based polymer with a coupling number of F denotes that all of the polymer chains are coupled.

Thus, with respect to the modified conjugated diene-based polymer according to the embodiment of the present invention, the coupling number may be greater than 1 and less than the number of functional groups of the modifier used ($1<C.N<F$) while the molecular weight distribution curve has a unimodal shape.

As another example, a silicon (Si) content of the modified conjugated diene-based polymer may be in a range of 50 ppm or more, 100 ppm or more, 100 ppm to 10,000 ppm, or 100 ppm to 5,000 ppm based on a weight of the modified conjugated diene-based polymer, and mechanical properties, such as tensile properties and viscoelastic properties, of a rubber composition including the modified conjugated diene-based polymer are excellent within this range. The Si content may denote an amount of Si atoms present in the modified conjugated diene-based polymer. The Si atom may be derived from a modifier-derived functional group.

As another example, a nitrogen (N) content of the modified conjugated diene-based polymer may be in a range of 50 ppm or more, 100 ppm or more, 100 ppm to 10,000 ppm, or 100 ppm to 5,000 ppm based on a total weight of the modified conjugated diene-based polymer, and mechanical properties, such as tensile properties and viscoelastic properties, of the rubber composition including the modified conjugated diene-based polymer are excellent within this range. The N content may denote an amount of N atoms present in the modified conjugated diene-based polymer, wherein the N atom may be derived from a modifier-derived functional group.

The Si content, for example, may be measured by inductively coupled plasma (ICP) analysis, and the ICP analysis may be performed by using an inductively coupled plasma optical emission spectrometer (ICP-OES; Optima 7300DV). In a case in which the inductively coupled plasma optical emission spectrometer is used, the Si content may be measured in such a manner that about 0.7 g of a sample was put in a platinum (Pt) crucible, about 1 mL of concentrated sulfuric acid (98 wt %, Electronic grade) was added and heated at 300° C. for 3 hours, the sample was burnt in an electric furnace (Thermo Scientific, Lindberg Blue M) with a program including the following steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), 1 mL of concentrated nitric acid (48 wt %) and 20 µl of concentrated hydrofluoric acid (50 wt %) were added to a residue, the platinum crucible was sealed and shaken for 30 minutes or more to prepare a sample, 1 mL of boric acid was added to the sample, and the mixture was stored at 0° C. for 2 hours or more and then diluted with 30 mL of ultrapure water to measure the Si content.

In this case, the sample was a modified conjugated diene-based polymer in which a solvent was removed by putting and stirring the sample in hot water heated with steam, wherein a residual monomer, a residual modifier, and oil were removed.

Also, the N content, for example, may be measured by NSX analysis, and the NSX analysis may be performed by using a trace nitrogen analyzer (NSX-2100H).

For example, in a case in which the trace nitrogen analyzer was used, the trace nitrogen analyzer (Autosampler, Horizontal furnace, PMT & Nitrogen detector) was turned on, carrier gas flow rates were set at 250 ml/min for Ar, 350 ml/min for 02, and 300 ml/min for an ozonizer, a heater was set at 800° C., and the analyzer was stabilized by waiting for about 3 hours. After the analyzer was stabilized, a calibration curve with a range of 5 ppm, 10 ppm, 50 ppm, 100 ppm, and 500 ppm was created using a nitrogen standard (AccuStandard S-22750-01-5 ml), an area corresponding to each concentration was obtained, and a straight line was then created using a ratio of the concentration to the area. Thereafter, a ceramic boat containing 20 mg of a sample was placed in the automatic sampler of the analyzer and an area was measured. An N content was calculated using the obtained area of the sample and the calibration curve.

In this case, the sample used in the NSX analysis was a modified conjugated diene-based polymer sample in which a solvent was removed by putting and stirring the sample in hot water heated with steam, wherein it may be a sample from which a residual monomer and a residual modifier were removed. Also, if oil was added to the above sample, it may be a sample after the oil was extracted (removed).

As another example, the modified conjugated diene-based polymer may have a Mooney stress-relaxation rate measured at 100° C. of 0.7 or more, 0.7 or more to 3.0 or less, 0.7 or more to 2.5 or less, or 0.7 or more to 2.0 or less.

Herein, the Mooney stress-relaxation rate denotes a change in stress in response to the same amount of strain, wherein it may be measured by using a Mooney viscometer. Specifically, the Mooney stress-relaxation rate was measured with a large rotor at a rotor speed of 2±0.02 rpm at 100° C. using MV2000E by Monsanto Company, and, after the polymer was left standing for 30 minutes or more at room temperature (23±5° C.), 27±3 g of the polymer was taken and filled into a die cavity, Mooney viscosity was measured while applying a torque by operating a platen, and the Mooney stress-relaxation rate was obtained by measuring a slope of change in the Mooney viscosity obtained while the torque was released.

The Mooney stress-relaxation rate may be used as an indicator of a branch structure of the polymer, and, for example, in a case in which polymers having the same Mooney viscosity are compared, since the larger the number of branches is the smaller the Mooney stress-relaxation rate is, the Mooney stress-relaxation rate may be used as an indicator of a degree of branching.

Also, the modified conjugated diene-based polymer may have a Mooney viscosity of 30 or more, 40 to 150, or 40 to 140 at 100° C., and processability and productivity are excellent within this range.

As another example, the modified conjugated diene-based polymer may have a shrinking factor (g'), which is obtained by gel permeation chromatography-light scattering measurement with a viscosity detector, of 0.8 or more, particularly 0.8 or more to 3.0 or less, and more particularly 0.8 or more to 1.3 or less.

Herein, the shrinking factor (g') obtained by gel permeation chromatography-light scattering measurement is a ratio of intrinsic viscosity of a polymer having branches to intrinsic viscosity of a linear polymer having the same absolute molecular weight, wherein it may be used as an index of a branch structure of the polymer having branches, that is, as an index of percentage of the branches. For example, the number of branches of the corresponding polymer tends to increase as the shrinking factor decreases, and thus, when comparing polymers having the same absolute molecular weight, since the shrinking factor becomes smaller as the number of branches increases, the shrinking factor may be used as an indicator of a degree of branching.

Also, a chromatogram was measured using a gel chromatography-light scattering measurement apparatus equipped with a viscosity detector, and the shrinking factor was calculated based on solution viscosity and light scattering method, wherein, specifically, an absolute molecular weight and intrinsic viscosity corresponding to each absolute molecular weight were obtained by using a GPC-light scattering measurement apparatus equipped with a viscosity detector and a light scattering detector to which two columns using a polystyrene-based gel as a filler were connected, the intrinsic viscosity of the linear polymer corresponding to the absolute molecular weight was calculated, and the shrinking factor was then determined as a ratio of the intrinsic viscosities corresponding to each absolute molecular weight. For example, after a sample was injected into a GPC-light scattering measurement apparatus (Viscotek TDAmax, Malvern Panalytical Ltd.) equipped with a light scattering detector and a viscosity detector to obtain an absolute molecular weight from the light scattering detector and obtain intrinsic viscosity [η] with respect to the absolute molecular weight from the light scattering detector and the viscosity detector, intrinsic viscosity [η]$_0$ of the linear polymer with respect to the absolute molecular weight was calculated by the following Equation 2, and an average value of ratios ([η]/[η]$_0$) of the intrinsic viscosities corresponding to each absolute molecular weight was expressed as the shrinking factor. In this case, a mixed solution of tetrahydrofuran and N,N,N',N'-tetramethylethylenediamine (adjusted by mixing 20 mL of N,N,N',N'-tetramethylethylenediamine with 1 L of tetrahydrofuran) was used as an eluent, PL Olexis (Agilent Technologies, Inc.) was used as a column, the measurement was made at an oven temperature of 40° C. and a THF flow rate of 1.0 mL/min, and the sample was prepared by dissolving 15 mg of a polymer in 10 mL of THF.

$$[\eta]_0 = 10^{-3.883} M^{0.771} \quad \text{[Equation 2]}$$

In Equation 2, M is the absolute molecular weight.

Furthermore, the modified conjugated diene-based polymer may have a vinyl content of 5 wt % or more, 10 wt % or more, or 10 wt % to 60 wt %. Herein, the vinyl content denotes a content of a 1,2-added conjugated diene-based monomer rather than a 1,4-added conjugated diene-based monomer based on 100 wt % of a conjugated diene-based copolymer composed of a monomer having a vinyl group and an aromatic vinyl-based monomer.

The modified monomer represented by Formula 1 according to an embodiment of the present invention may introduce a functional group into a polymer chain while polymerized with another monomer to form the polymer chain.

Specifically, in Formula 1, $F_1$ may be a 5-membered heterocyclic group having 2 to 4 carbon atoms which includes at least one heteroatom selected from the group consisting of nitrogen (N), sulfur (S), and oxygen (O).

More specifically, the modified monomer represented by Formula 1 may be a compound represented by Formula 2 below.

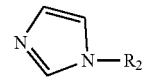

[Formula 2]

In Formula 2, $R_2$ is an alkenyl group having 2 to 10 carbon atoms.

More specifically, the modified monomer represented by Formula 1 may be a compound represented by the following Formula 3, that is, 1-vinyl imidazole (1-vinyl-1H-imidazole).

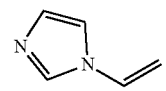

[Formula 3]

Also, the modifier according to the present invention may be a modifier for modifying at least one end of the conjugated diene-based polymer, and may be a silica-affinity modifier as a specific example. The silica-affinity modifier may denote a modifier containing a silica-affinity functional group in a compound used as the modifier, and the silica-affinity functional group may denote a functional group in which an interaction between a silica-based filler and a modifier-derived functional group is possible due to excellent affinity with a filler, particularly, the silica-based filler.

Specifically, according to an embodiment of the present invention, the aminoalkoxysilane-based modifier may include at least one selected from compounds represented by Formulae 4 and 5 below.

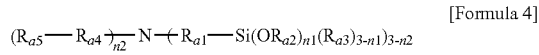
[Formula 4]

In Formula 4, $R_{a1}$ and $R_{a4}$ are each independently a single bond or an alkylene group having 1 to 10 carbon atoms, $R_{a2}$ and $R_{a3}$ are each independently an alkyl group having 1 to 10 carbon atoms, $R_{a5}$ is a hydrogen atom, an alkyl group having 1 to 10 carbon atoms, or a divalent, trivalent, or tetravalent alkylsilyl group substituted with an alkyl group having 1 to 10 carbon atoms, n1 is an integer of 1 to 3, and n2 is an integer of 0 to 2,

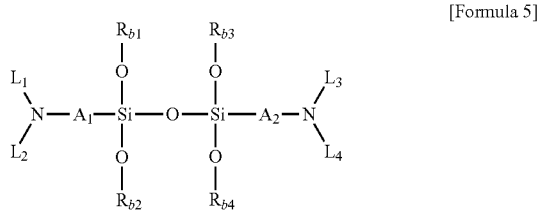
[Formula 5]

In Formula 5, $A_1$ and $A_2$ are each independently an alkylene group having 1 to 20 carbon atoms, $R_{b1}$ to $R_{b4}$ are each independently an alkyl group having 1 to 20 carbon atoms, and $L_1$ to $L_4$ are each independently an alkyl group having 1 to 20 carbon atoms, an aryl group having 6 to 20 carbon atoms, or a divalent, trivalent or tetravalent alkylsilyl group substituted with an alkyl group having 1 to 10 carbon atoms.

Specifically, the aminoalkoxysilane-based modifier according to the embodiment of the present invention may be the compound represented by Formula 4, wherein, in Formula 4, $R_{a1}$ and $R_{a4}$ may each independently be a single bond or an alkylene group having 1 to 5 carbon atoms, $R_{a2}$ and $R_{a1}$ may each independently be an alkyl group having 1 to 5 carbon atoms, $R_{a5}$ may be a hydrogen atom, an alkyl group having 1 to 5 carbon atoms, or a tetravalent alkylsilyl group substituted with an alkyl group having 1 to 5 carbon atoms, n1 may be an integer of 2 or 3, and n2 may be an integer of 0 to 2.

More specifically, the compound represented by Formula 4 may include at least one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, 3-(dimethoxy(methyl)silyl)-N,N-diethylpropane-1-amine, tri(trimethoxysilyl)amine, tri-(3-(trimethoxysilyl)propyl)amine, and N,N-bis(3-(diethoxy(methyl)silyl)propyl)-1,1,1-trimethylsilanamine.

Also, the aminoalkoxysilane-based modifier according to another embodiment of the present invention may be the compound represented by Formula 5, wherein, in Formula 5, $A_1$ and $A_2$ may each independently be an alkylene group having 1 to 10 carbon atoms, $R_{b1}$ to $R_{b4}$ may each independently be an alkyl group having 1 to 10 carbon atoms, and $L_1$ to $L_4$ may each independently be an alkyl group having 1 to 10 carbon atoms, an aryl group having 6 to 12 carbon atoms, or a tetravalent alkylsilyl group substituted with an alkyl group having 1 to 5 carbon atoms.

More specifically, the compound represented by Formula 5 may include at least one selected from the group consisting of 3,3'-(1,1,3,3-tetramethoxydisiloxane-1,3-diyl)bis(N,N-dimethylpropan-1-amine), 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,Ndimpropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine)), N,N'-((1,1,3,3-tetraethoxydisiloxane-1,3-diyl)bis(propan-3,1-diyl))bis(1,1,1-trimethyl-N-(trimethylsilyl)silanamine)), N,N'-((1,1,3,3-tetrapropoxydisiloxane-1,3-diyl)bis(propan-3,1-diyl))bis(1,1,1-trimethyl-N-(trimethylsilyl)silanamine)), N,N'-((1,1,3,3-tetramethoxydisiloxane-1,3-diyl)bis(propan-3,1-diyl))bis(1,1,1-trimethyl-N-phenylsilanamine)), N,N'-((1,1,3,3-tetraethoxydisiloxane-1,3-diyl)bis(propan-3,1-diyl))bis(1,1,1-trimethyl-N-phenylsilanamine)), and N,N'-((1,1,3,3-tetrapropoxydisiloxane-1,3-diyl)bis(propan-3,1-diyl))bis(1,1,1-trimethyl-N-phenylsilanamine)).

As described above, with respect to the modified conjugated diene-based polymer according to the embodiment of the present invention, the polymer may have a specific structure and may have specific molecular weight distribution and shape. The structure of the polymer may be expressed by physical properties, such as a shrinking factor, a Mooney stress-relaxation rate, and a coupling number, the molecular weight distribution and its shape may be expressed in terms of a molecular weight distribution value, a shape of a molecular weight distribution curve, and a coupling number, and both-terminal modification by the modifier and the modified monomer may affect the structure and the molecular weight distribution and its shape. The parameters expressing the structure of the polymer and the characteristics related to the molecular weight distribution may be satisfied by a preparation method to be described later.

Also, the preparation of the polymer by the above preparation method is desirable to satisfy the above-described characteristics, but, when all of the above-described characteristics are satisfied, effects to be realized in the present invention may be achieved.

Furthermore, the present invention provides a method of preparing the modified conjugated diene-based polymer. Since the modified conjugated diene-based polymer according to the embodiment of the present invention is prepared by the preparation method to be described later, a molecular weight distribution may be narrow, and having a polydispersity index of 1.0 or more to less than 1.7 while a molecular weight distribution is unimodal, as indicated by a molecular weight distribution curve obtained by gel permeation chromatography having a unimodal shape. Thus, with respect to the modified conjugated diene-based polymer, both tensile properties and viscoelastic properties are well-balanced and excellent while processability is excellent.

The method of preparing the modified conjugated diene-based polymer according to an embodiment of the present invention includes a step (S1) of preparing an active polymer having a modified monomer-derived functional group introduced thereinto by polymerization of a modified monomer represented by the following Formula 1 with a conjugated diene-based monomer or with a conjugated diene-based monomer and an aromatic vinyl-based monomer in the presence of a polymerization initiator in a hydrocarbon solvent; and a step (S2) of reacting or coupling the active polymer prepared in the step (S1) with an aminoalkoxysilane-based modifier, wherein the step (S1) may be continuously performed in two or more polymerization reactors, and a polymerization conversion rate of the first reactor of the polymerization reactors may be 50% or less.

     [Formula 1]

In Formula 1, $F_1$ and $R_1$ are the same as defined above, and the aminoalkoxysilane-based modifier is the same as described above.

Also, more specifically, the modified monomer represented by Formula 1 may be the compound represented by Formula 2 or the compound represented by Formula 3 as described above.

The hydrocarbon solvent is not particularly limited, but, for example, may be at least one selected from the group consisting of n-pentane, n-hexane, n-heptane, isooctane, cyclohexane, toluene, benzene, and xylene.

The polymerization initiator is not particularly limited, but, for example, may be at least one selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphtylsodium, naphtylpotassium, lithium alkoxide, sodium alkoxide, potassium alkoxide, lithium sulfonate, sodium sulfonate, potassium sulfonate, lithium amide, sodium amide, potassium amide, and lithium isopropylamide.

According to an embodiment of the present invention, the polymerization initiator may be used in an amount of 0.01 mmol to 10 mmol, 0.05 mmol to 5 mmol, 0.1 mmol to 2 mmol, 0.1 mmol to 1 mmol, or 0.15 mmol to 0.8 mmol based on total 100 g of the monomer. Herein, the total 100 g of the monomer may represent a total amount of the modified monomer and the conjugated diene-based monomer, or a total amount of the modified monomer, the conjugated diene-based monomer, and the aromatic vinyl-based monomer.

Also, according to an embodiment of the present invention, the modified monomer may be used in an amount of 0.001 g to 10 g, preferably 0.01 g to 10 g, and more preferably 0.1 g to 10 g based on 100 g of the conjugated diene-based monomer.

The polymerization of the step (S1), for example, may be anionic polymerization, and, specifically, may be living anionic polymerization in which an anionic active site at polymerization end is obtained by a growth polymerization reaction by anions. Also, the polymerization of the step (S1) may be temperature rise polymerization, isothermal polymerization, or constant temperature polymerization (adiabatic polymerization), the constant temperature polymerization may denote a polymerization method including a step of performing polymerization not by randomly applying heat but with its own reaction heat after a polymerization initiator is added, the temperature rise polymerization may denote a polymerization method in which the temperature is increased by randomly applying heat after the polymerization initiator is added, and the isothermal polymerization may denote a polymerization method in which the temperature of the polymer is constantly maintained by taking away heat or applying heat after the polymerization initiator is added.

Furthermore, according to an embodiment of the present invention, the polymerization of the step (S1) may be performed by further including a diene-based compound having 1 to 10 carbon atoms in addition to the conjugated diene-based monomer, and, in this case, there is an effect of preventing the formation of a gel on a reactor wall during a long-time operation. An example of the diene-based compound may be 1,2-butadiene.

The polymerization of the step (S1), for example, may be performed in a temperature range of 80° C. or less, −20° C. to 80° C., 0° C. to 80° C., 0° C. to 70° C., or 10° C. to 70° C., and, since the molecular weight distribution of the polymer is controlled to be narrow within this range, there is an excellent improvement in physical properties.

The active polymer prepared in the step (S1) may denote a polymer in which a polymeric anion is combined with an organometallic cation.

According to an embodiment of the present invention, the method of preparing the modified conjugated diene-based polymer may be performed in a plurality of reactors including two or more polymerization reactors and a modification reactor by a continuous polymerization method. As a specific example, the step (S1) may be continuously performed in two or more polymerization reactors including a first reactor, and the number of the polymerization reactors may be determined flexibly according to reaction conditions and environment. The continuous polymerization method may denote a reaction process in which a reactant is continuously supplied to the reactor and the resulting reaction product is continuously discharged. In a case in which the continuous polymerization method is used, productivity and processability are excellent, and uniformity of the prepared polymer is excellent.

Also, according to an embodiment of the present invention, during the continuous preparation of the active polymer in the polymerization reactor, a polymerization conversion rate in the first reactor may be in a range of 50% or less, 10% to 50%, or 20% to 50%, and a polymer having a linear structure may be induced during polymerization by suppressing a side reaction generated while the polymer is formed after the polymerization is initiated within this range. Accordingly, since the molecular weight distribution of the polymer may be narrowly controlled, there is an excellent improvement in physical properties.

In this case, the polymerization conversion rate may be controlled according to reaction temperature and reactor residence time.

The polymerization conversion rate, for example, may be determined by measuring a solid concentration of a polymer solution containing a polymer during the polymerization of the polymer. As a specific example, in order to secure the polymer solution, a cylinder-type vessel is installed at an outlet of each polymerization reactor to fill the cylindrical-type vessel with a predetermined amount of the polymer solution, the cylindrical-type vessel is separated from the reactor to measure a weight (A) of the cylinder filled with the polymer solution, the polymer solution filled in the cylindrical-type vessel is transferred to an aluminum container, for example, an aluminum dish, to measure a weight (B) of the cylindrical-type vessel having the polymer solution removed therefrom, the aluminum container containing the polymer solution is dried in an oven at 140° C. for 30 minutes, a weight (C) of the dried polymer is measured, and the polymerization conversion rate may then be calculated according to Equation 1 below.

$$\text{Polymerization conversion rate (\%)} = \frac{\text{weight }(C)}{[(\text{weight }(A) - \text{weight }(B)) \times \text{total solid content (wt\%, } TSC) \text{ of each reactor}]} \quad [\text{Equation 1}]$$

The polymer polymerized in the first reactor is sequentially transferred to the polymerization reactor before the modification reactor so that the polymerization may proceed until the polymerization conversion rate reaches 95% or more, and, after the polymerization in the first reactor, the polymerization conversion rate for each reactor, for example, a second reactor, or from the second reactor to the polymerization reactor before the modification reactor, may be appropriately adjusted for each reactor to control the molecular weight distribution.

In the step (S1), during the preparation of the active polymer, polymer retention time in the first reactor may be in a range of 1 minute to 40 minutes, 1 minute to 30 minutes, or 5 minutes to 30 minutes, and the adjustment of the polymerization conversion rate is easy within this range. Accordingly, the molecular weight distribution of the polymer may be narrowly controlled, and thus, there is an excellent improvement in physical properties.

The expression "polymer" in the present invention may denotes an intermediate in the form of a polymer which is undergoing polymerization in each reactor during the step (S1) before the step (S1) or the step (S2) is completed to obtain the active polymer or the modified conjugated diene-based polymer, or may denote a polymer having a polymerization conversion rate of less than 95% which is undergoing polymerization in the reactor.

According to an embodiment of the present invention, the active polymer prepared in the step (S1) may have a molecular weight distribution as indicated by a polydispersity index(PDI; Mw/Mn) of less than 1.5, 1.0 or more to less than 1.5, or 1.1 or more to less than 1.5, and, since the modified conjugated diene-based polymer prepared by the modification reaction or coupling with the modifier within this range has a narrow molecular weight distribution, there is an excellent improvement in physical properties.

The polymerization of the step (S1) may be performed by including a polar additive, and the polar additive may be added in an amount of 0.001 g to 50 g, 0.001 g to 10 g, or 0.005 g to 0.1 g based on total 100 g of the monomer. As another example, the polar additive may be added in an amount of 0.001 g to 10 g, 0.005 g to 5 g, or 0.005 g to 4 g based on total 1 mmol of the polymerization initiator.

The polar additive, for example, may be at least one selected from the group consisting of tetrahydrofuran, 2,2-di(2-tetrahydrofuryl)propane, diethylether, cycloamylether, dipropyl ether, ethylene methyl ether, ethylene dimethyl ether, diethyl glycol, dimethyl ether, tertiary butoxyethoxyethane, bis(3-dimethylaminoethyl)ether, (dimethylaminoethyl)ethylether, trimethylamine, triethylamine, tripropylamine, N,N,N',N'-tetramethylethylenediamine, sodium mentholate, and 2-ethyl tetrahydrofurfuryl ether, and may preferably be 2,2-di(2-tetrahydrofuryl)propane, triethylamine, tetramethylethylenediamine, sodium mentholate, or 2-ethyl tetrahydrofurfuryl ether, and, in a case in which the conjugated diene-based monomer and the aromatic vinyl-based monomer are copolymerized by including the polar additive, since the polar additive compensates a difference in reaction rates of these monomers, it has an effect of inducing the random copolymer to be easily formed.

According to an embodiment of the present invention, the reaction or coupling in the step (S2) may be performed in the modification reactor, and, in this case, the modifier may be used in an amount of 0.01 mmol to 10 mmol based on the total 100 g of the monomer. As another example, the modifier may be used in a molar ratio of 1:0.1 to 1:10, 1:0.1 to 1:5, or 1:0.1 to 1:3 based on 1 mol of the polymerization initiator of the step (S1).

Also, according to an embodiment of the present invention, the modifier may be added to the modification reactor, and the step (S2) may be performed in the modification reactor. As another example, the modifier may be introduced into a transfer unit for transferring the active polymer prepared in the step (S1) to the modification reactor for performing the step (S2), and the reaction or coupling may proceed by mixing the active polymer and the modifier in the transfer unit.

The method of preparing the modified conjugated diene-based polymer according to the embodiment of the present invention is a method capable of satisfying the characteristics of the above-described modified conjugated diene-based polymer, and the effect to be achieved in the present invention may be achieved when the above characteristics are satisfied as described above, but it is necessary to satisfy at least the polymerization conversion rate when being transferred from the first reactor to the second reactor under the continuous process in the above preparation method, and the physical properties of the modified conjugated diene-based polymer according to the present invention may be realized by various controlling other polymerization conditions.

In addition, the present invention provides a rubber composition including the above-described modified conjugated diene-based polymer.

The rubber composition may include the modified conjugated diene-based polymer in an amount of 10 wt % or more, wt % to 100 wt %, or 20 wt % to 90 wt %, and mechanical properties, such as tensile strength and abrasion resistance, are excellent and the balance between physical properties is excellent within this range.

Furthermore, the rubber composition may further include another rubber component, if necessary, in addition to the modified conjugated diene-based polymer, and, in this case, the rubber component may be included in an amount of 90 wt % or less based on a total weight of the rubber composition. Specifically, the other rubber component may be included in an amount of 1 part by weight to 900 parts by weight based on 100 parts by weight of the modified conjugated diene-based polymer.

The rubber component, for example, may be a natural rubber or a synthetic rubber, and specific examples of the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, a butyl rubber, and a halogenated butyl rubber. Any one thereof or a mixture of two or more thereof may be used.

The rubber composition, for example, may include 0.1 part by weight to 200 parts by weight or 10 parts by weight to 120 parts by weight of a filler based on 100 parts by weight of the modified conjugated diene-based polymer of the present invention. The filler, for example, may be a silica-based filler, specific examples of the silica-based filler may be wet silica (hydrous silicic acid), dry silica (anhydrous silicic acid), calcium silicate, aluminum silicate, or colloidal silica, and the filler may preferably be wet silica in which an effect of improving both fracture characteristics and wet grip is the most significant. Also, the rubber composition may further include a carbon black-based filler, if necessary.

As another example, in a case in which silica is used as the filler, a silane coupling agent for the improvement of reinforcement and low heat generation property may be used together. Specific examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl) tetrasulfide, bis(3-trimethoxysilylpropyl)tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. In consideration of the effect of improving the reinforcement, the silane coupling agent may preferably be bis(3-triethoxysilylpropyl)polysulfide or 3-trimethoxysilylpropyl benzothiazyl tetrasulfide.

Also, in the rubber composition according to an embodiment of the present invention, since the modified conjugated diene-based polymer, in which a functional group having a high affinity with the silica is introduced into the active site, is used as the rubber component, a mixing amount of the silane coupling agent may be reduced in comparison to a conventional case. Accordingly, the silane coupling agent may be used in an amount of 1 part by weight to 20 parts by weight or 5 parts by weight to 15 parts by weight based on 100 parts by weight of the silica. Within this range, the silane coupling agent may prevent gelation of the rubber component while sufficiently having an effect as a coupling agent.

The rubber composition according to the embodiment of the present invention may be sulfur cross-linkable, and may further include a vulcanizing agent. The vulcanizing agent may specifically be sulfur powder, and may be included in an amount of 0.1 part by weight to 10 parts by weight based on 100 parts by weight of the rubber component, and, within this range, the low fuel consumption property is excellent while securing elastic modulus and strength required for the vulcanized rubber composition.

The rubber composition according to the embodiment of the present invention may further include various additives, such as a vulcanization accelerator, process oil, an antioxidant, a plasticizer, an anti-aging agent, a scorch inhibitor, zinc white, stearic acid, a thermosetting resin, or a thermoplastic resin, used in the general rubber industry, in addition to the above-described components.

For example, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used as the vulcanization accelerator, and the vulcanization accelerator may be included in an amount of 0.1 part by weight to 5 parts by weight based on 100 parts by weight of the rubber component.

The process oil acts as a softener in the rubber composition, wherein examples of the process oil may be a paraffin-based, naphthenic-based, or aromatic-based compound, the aromatic-based process oil may be used in consideration of tensile strength and abrasion resistance, and the naphthenic-based or paraffin-based process oil may be used in consideration of hysteresis loss and low temperature characteristics. The process oil, for example, may be included in an amount of 100 parts by weight or less based on 100 parts by weight of the rubber component, and, within this range, decreases in tensile strength and low heat generation property (low fuel consumption property) of the vulcanized rubber may be prevented.

Examples of the antioxidant may be 2,6-di-t-butyl paracresol, dibutylhydroxytoluene, 2,6-bis((dodecylthio)methyl)-4-nonylphenol, or 2-methyl-4,6-bis((octylthio)methyl)phenol, and the antioxidant may be used in an amount of 0.1 part by weight to 6 parts by weight based on 100 parts by weight of the rubber component.

Examples of the anti-aging agent may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone, and the anti-aging agent may be used in an amount of 0.1 part by weight to 6 parts by weight based on 100 parts by weight of the rubber component.

The rubber composition according to the embodiment of the present invention may be obtained by kneading the above mixing formulation using a kneader such as a Banbury mixer, a roll, and an internal mixer, and a rubber composition having excellent abrasion resistance as well as low heat generation property may also be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, or a bead coating rubber, or various industrial rubber products such as an anti-vibration rubber, a belt conveyor, and a hose.

In addition, the present invention provides a tire prepared by using the rubber composition.

The tire may include a tire or a tire's tread.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

Preparation Example 1: Preparation of 3-(dimethoxy(methyl)silyl)-N,N-diethylpropane-1-amine (3-chloropropyl)dimethoxymethylsilane (CAS No. 18171-19-2@Sigma-Aldrich, 1.83 g, 10 mmol) and diethylamine (0.8 g, 11 mmol) were completely dissolved by stirring in 100 ml of toluene at room temperature (23±3° C.), and the mixture was then refluxed and stirred at 110° C. for 2 hours to obtain 3-(dimethoxy(methyl)silyl)-N,N-diethylpropane-1-amine (yield: 2.5 g, >98%).

Preparation Example 2: Preparation of N,N-bis(3-(diethoxy(methyl)silyl)propyl)-1,1,1-trimethylsilanamine 33.9 g (0.2 mol) of diallyltrimethylsilylamine and 0.26 g of a toluene solution (platinum content: 3 wt %) of a platinum-1,3-divinyl-1,1,3,3-tetramethyldisiloxane complex were added and heated to 70° C. After the temperature in a reactor was stabilized, 53.7 g (0.4 mol) of methyldiethoxysilane was added dropwise for 4 hours, and reacted at the above temperature for 1 hour to prepare 58.1 g of N,N-bis(3-(diethoxy(methyl)silyl)propyl)-1,1,1-trimethylsilamine.

Preparation Example 3: Preparation of N,N'-((1,1,3,3-tetraethoxydisiloxane-1,3-diyl)bis(propane-3,1-diyl))bis(1,1,1-trimethyl-N-(trimethylsilyl)silanamine)

3,3'-(1,1,3,3-tetramethoxysiloxane-1,3-diyl)bis(propane-1-amine) (CAS No. 76712-65-7@LookChem, 3.13 g, 10 mmol) was completely dissolved by stirring in 100 ml of toluene at room temperature (23±3° C.), and the mixture was then reacted with trimethylsilyl chloride (1.14 g, 10.5 mmol) in the presence of triethylamine (1.11 g, 11 mmol), as a base, at 40° C. for 2 hours as in the following reaction formula to prepare N,N'-((1,1,3,3-tetramethoxydisiloxane-1,3-diyl)bis(propane-3,1-diyl))bis(1,1,1-trimethyl-N-(trimethylsilyl)silanamine) (yield: 5.6 g, >98%).

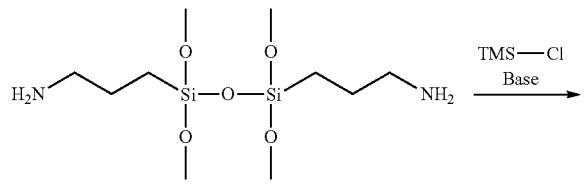

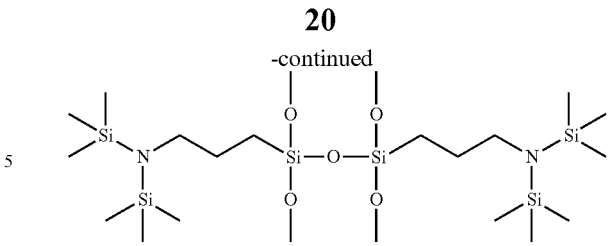

Example 1

A styrene solution in which 60 wt % of styrene was dissolved in n-hexane, a 1,3-butadiene solution in which 60 wt % of 1,3-butadiene was dissolved in n-hexane, a modified monomer solution in which 15 wt % of 1-vinyl imidazole (Sigma-Aldrich, Cas No. 1072-63-5) was dissolved in n-hexane, n-hexane, a 1,2-butadiene solution in which 2.0 wt % of 1,2-butadiene was dissolved in n-hexane, a solution, in which 10 wt % of 2,2-di(2-tetrahydrofuryl)propane was dissolved in n-hexane, as a polar additive, and a n-butyllithium solution, in which 6.6 wt % of n-butyllithium was dissolved in n-hexane, were injected into a first reactor among continuous reactors, in which three reactors were connected in series, at rates of 1.85 kg/h (styrene solution), 11.9 kg/h (1,3-butadiene solution), 30 g/h (modified monomer solution), 48.0 kg/h (n-hexane), 40.0 g/h (1,2-butadiene solution), 61.0 g/h (polar additive solution), and 106.1 g/h (n-butyllithium solution), respectively. In this case, a temperature of the first reactor was maintained at 50° C., and a polymer was transferred from the first reactor to a second reactor through a transfer pipe when a polymerization conversion rate reached 40%.

Subsequently, a 1,3-butadiene solution, in which 60 wt % of 1,3-butadiene was dissolved in n-hexane, was injected into the second reactor at a rate of 2.96 kg/h. In this case, a temperature of the second reactor was maintained at 65° C., and a polymer was transferred from the second reactor to a third reactor through a transfer pipe when the polymerization conversion rate reached 95% or more.

The polymer was transferred from the second reactor to the third reactor, and a solution, in which 20 wt % of the 3-(dimethoxy(methyl)silyl)-N,N-diethylpropane-1-amine of Preparation Example 1 was dissolved, was added as a modifier to the third reactor at a rate of 64.0 g/h. A temperature of the third reactor was maintained at 65° C.

Thereafter, an IR1520(BASF SE) solution, in which 30 wt % of IR1520 was dissolved, as an antioxidant, was injected into a polymerization solution discharged from the third reactor at a rate of 167 g/h and stirred. The resulting polymer was put in hot water heated with steam and stirred to remove the solvent to prepare a modified conjugated diene-based polymer.

Example 2

A modified conjugated diene-based polymer was prepared in the same manner as in Example 1 except that, in Example 1, the polymer was transferred from the first reactor to the second reactor through a transfer pipe when the polymerization conversion rate reached 43%, and a solution, in which 20 wt % of N,N-bis(3-(diethoxy(methyl)silyl)propyl)-1,1,1-trimethylsilanamine of Preparation Example 2, instead of 3-(dimethoxy(methyl)silyl)-N,N-diethylpropane-1-amine, was dissolved, was continuously supplied as a modifier to the third reactor at a rate of 116.0 g/h.

Example 3

A modified conjugated diene-based polymer was prepared in the same manner as in Example 1 except that, in Example 1, the polymer was transferred from the first reactor to the second reactor through a transfer pipe when the polymerization conversion rate reached 41%, and a solution, in which 20 wt % of N,N'-((1,1,3,3-tetramethoxydisiloxane-1,3-diyl)bis(propane-3,1-diyl))bis(1,1,1-trimethyl-N-(trimethylsilyl)silanamine) of Preparation Example 3, instead of 3-(dimethoxy(methyl)silyl)-N,N-diethylpropane-1-amine, was dissolved, was continuously supplied as a modifier to the third reactor at a rate of 103.5 g/h.

Comparative Example 1

110 g of styrene, 870 g of 1,3-butadiene, 0.54 g of 1-vinylimidazole, 5,000 g of n-hexane, and 1.13 g of 2,2-di(2-tetrahydrofuryl)propane, as a polar additive, were added to a 20 L autoclave reactor, and an internal temperature of the reactor was then increased to 50° C. When the internal temperature of the reactor reached 50° C., 5.5 mmol of n-butyllithium was added to the reactor to perform an adiabatic heating reaction. After about 20 minutes, 20 g of 1,3-butadiene was added to cap polymer ends with butadiene. After 5 minutes, 5.5 mmol of the 3-(dimethoxy(methyl)silyl)-N,N-diethylpropane-1-amine of Preparation Example 1 was added as a modifier and reacted for 15 minutes. Thereafter, the polymerization reaction was stopped by using ethanol and 45 ml of a solution, in which 0.3 wt % of IR1520(BASF SE), as an antioxidant, was dissolved in n-hexane, was added. A polymer thus obtained was put in hot water heated by steam and stirred to remove the solvent to prepare a modified conjugated diene-based polymer.

Comparative Example 2

A styrene solution in which 60 wt % of styrene was dissolved in n-hexane, a 1,3-butadiene solution in which 60 wt % of 1,3-butadiene was dissolved in n-hexane, n-hexane, a 1,2-butadiene solution in which 2.0 wt % of 1,2-butadiene was dissolved in n-hexane, a solution, in which 10 wt % of 2,2-di-2(tetrahydrofuryl)propane was dissolved in n-hexane, as a polar additive, and a n-butyllithium solution, in which 6.6 wt % of n-butyllithium was dissolved in n-hexane, were injected into a first reactor of continuous reactors, in which two reactors were connected in series, at rates of 1.85 kg/h (styrene solution), 11.9 kg/h (1,3-butadiene solution), 48.0 kg/h (n-hexane), 40.0 g/h (1,2-butadiene solution), 61.0 g/h (polar additive), and 106.1 g/h (n-butyllithium solution), respectively. In this case, a temperature of the first reactor was maintained at 55° C., and a polymer was transferred from the first reactor to a second reactor through a transfer pipe when a polymerization conversion rate reached 48%.

Subsequently, a 1,3-butadiene solution, in which 60 wt % of 1,3-butadiene was dissolved in n-hexane, was injected into the second reactor at a rate of 2.96 kg/h. In this case, a temperature of the second reactor was maintained at 65° C., and the reaction was terminated when the polymerization conversion rate reached 95% or more.

Thereafter, an IR1520 (BASF SE) solution, in which 30 wt % of IR1520 was dissolved, as an antioxidant, was injected into a polymerization solution discharged from the second reactor at a rate of 167 g/h and stirred. The resulting polymer was put in hot water heated with steam and stirred to remove the solvent to prepare an unmodified conjugated diene-based polymer.

Comparative Example 3

A styrene solution in which 60 wt % of styrene was dissolved in n-hexane, a 1,3-butadiene solution in which 60 wt % of 1,3-butadiene was dissolved in n-hexane, n-hexane, a 1,2-butadiene solution in which 2.0 wt % of 1,2-butadiene was dissolved in n-hexane, a solution, in which 10 wt % of 2,2-di-2(tetrahydrofuryl)propane was dissolved in n-hexane, as a polar additive, and a n-butyllithium solution, in which 6.6 wt % of n-butyllithium was dissolved in n-hexane, were injected into a first reactor among continuous reactors, in which three reactors were connected in series, at rates of 1.85 kg/h (styrene solution), 11.9 kg/h (1,3-butadiene solution), 48.0 kg/h (n-hexane), 40.0 g/h (1,2-butadiene solution), 61.0 g/h (polar additive), and 106.1 g/h(n-butyllithium solution), respectively. In this case, a temperature of the first reactor was maintained at 50° C., and a polymer was transferred from the first reactor to a second reactor through a transfer pipe when a polymerization conversion rate reached 41%.

Subsequently, a 1,3-butadiene solution, in which 60 wt % of 1,3-butadiene was dissolved in n-hexane, was injected into the second reactor at a rate of 2.96 kg/h. In this case, a temperature of the second reactor was maintained at 65° C., and a polymer was transferred from the second reactor to a third reactor through a transfer pipe when the polymerization conversion rate reached 95% or more.

The polymer was transferred from the second reactor to the third reactor, and a solution, in which 20 wt % of the 3-(dimethoxy(methyl)silyl)-N,N-diethylpropane-1-amine was dissolved, was added as a modifier to the third reactor at a rate of 64.0 g/h. A temperature of the third reactor was maintained at 65° C.

Thereafter, an IR1520 (BASF SE) solution, in which 30 wt % of IR1520 was dissolved, as an antioxidant, was injected into a polymerization solution discharged from the third reactor at a rate of 167 g/h and stirred. The resulting polymer was put in hot water heated with steam and stirred to remove the solvent to prepare a modified conjugated diene-based polymer.

Comparative Example 4

A modified conjugated diene-based polymer was prepared in the same manner as in Example 1 except that, in Example 1, the polymer was transferred from the first reactor to the second reactor through a transfer pipe when the polymerization conversion rate reached 47%, and a solution, in which 2.0 wt % of dichlorodimethylsilane, instead of 3-(dimethoxy(methyl)silyl)-N,N-diethylpropane-1-amine, was dissolved in n-hexane, was added as a modifier to the third reactor at a rate of 40.0 g/h.

Comparative Example 5

A modified conjugated diene-based polymer was prepared in the same manner as in Example 1 except that, in Example 1, the reaction temperatures were maintained at 75° C. in the first reactor, 80° C. in the second reactor, and 80° C. in the third reactor, respectively, and the polymer was transferred from the first reactor to the second reactor through a transfer pipe when the polymerization conversion rate reached 70%.

Reference Example 1

A modified conjugated diene-based polymer was prepared in the same manner as in Comparative Example 1 except that, in Comparative Example 1, 16.5 mmol of 3-(dimethoxy(methyl)silyl)-N,N-diethylpropane-1-amine was added.

Reference Example 2

A modified conjugated diene-based polymer was prepared in the same manner as in Comparative Example 1 except that, in Comparative Example 1, 2.5 mmol of 3-(dimethoxy(methyl)silyl)-N,N-diethylpropane-1-amine was added.

Experimental Example 1

A styrene unit content and a vinyl content in each polymer, a weight-average molecular weight (Mw, x10³ g/mol), a number-average molecular weight (Mn, x10³ g/mol), a molecular weight distribution as indicated by a polydispersity index (PDI), a coupling number, Mooney viscosity (MV), a Mooney stress-relaxation rate, a shrinking factor, a Si content, and an N content were respectively measured for the modified or unmodified conjugated diene-based polymers prepared in the examples and comparative examples. The results thereof are presented in Table 1 below.

1) Styrene Unit and Vinyl Contents (wt %)

Styrene unit (SM) and vinyl contents in each polymer were measured and analyzed using Varian VNMRS 500 MHz nuclear magnetic resonance (NMR).

In the NMR measurement, 1,1,2,2-tetrachloroethane was used as a solvent, a solvent peak was calculated to be 5.97 ppm, and the styrene unit and vinyl contents were calculated by determining a random styrene peak at 7.2 to 6.9 ppm, a block styrene peak at 6.9 to 6.2 ppm, a 1,4-vinyl peak at 5.8 to 5.1 ppm, and a 1,2-vinyl peak at 5.1 to 4.5 ppm.

(2) Weight-Average Molecular Weight (Mw, x10³ g/Mol), Number-Average Molecular Weight (Mn, x10³ g/Mol), Polydispersity Index (PDI), and Coupling Number (C.N)

The weight-average molecular weight (Mw) and the number-average molecular weight (Mn) were measured by gel permeation chromatography (GPC), and a molecular weight distribution curve was obtained. Also, a polydispersed index (PDI, Mw/Mn) was obtained by calculation using each of the measured molecular weights. Specifically, with respect to the GPC, two PLgel Olexis columns (Polymer Laboratories Ltd) and one PLgel mixed-C column (Polymer Laboratories Ltd) were combined and used, and polystyrene (PS) was used as a GPC standard material for the calculation of the molecular weight. A GPC measurement solvent was prepared by mixing 2 wt % of an amine compound in tetrahydrofuran. In this case, molecular weight distribution curves obtained are shown in FIGS. 1 to 4.

Also, some polymers were collected before injecting the modifier or coupling agent in each of the examples and the comparative Examples to obtain a peak molecular weight ($Mp_1$) of the polymer, and, thereafter, a peak molecular weight ($Mp_2$) of each modified conjugated diene-based polymer was obtained to calculate a coupling number by Equation 3 below.

$$\text{Coupling number (C.N)} = Mp_2/Mp_1 \quad \text{[Equation 3]}$$

3) Mooney Viscosity and Mooney Stress-Relaxation Rate

The Mooney viscosity (MV, (ML1+4, @100° C.) MU) was measured with a large rotor at a rotor speed of 2±0.02 rpm at 100° C. using MV-2000 (ALPHA Technologies, Ltd). After samples used in this case were left standing for 30 minutes or more at room temperature (23±3° C.), 27±3 g of each sample was taken and filled into a die cavity, and the Mooney viscosity was measured for 4 minutes by operating a platen.

After measuring the Mooney viscosity, a slope of change in the Mooney viscosity obtained while the torque was released was measured to obtain a Mooney stress-relaxation rate, an absolute value of the slope.

4) Si Content

The Si content was measured by inductively coupled plasma (ICP) analysis using an inductively coupled plasma optical emission spectrometer (ICP-OES; Optima 7300DV). Specifically, the Si content may be measured in such a manner that about 0.7 g of a sample was put in a platinum (Pt) crucible, about 1 mL of concentrated sulfuric acid (98 wt %, Electronic grade) was added and heated at 300° C. for 3 hours, the sample was burnt in an electric furnace (Thermo Scientific, Lindberg Blue M) with a program including the following steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), 1 mL of concentrated nitric acid (48 wt %) and 20 μl of concentrated hydrofluoric acid (50 w %) were added to a residue, the platinum crucible was sealed and shaken for 30 minutes or more to prepare a sample, 1 mL of boric acid was added to the sample, and the mixture was stored at 0° C. for 2 hours or more and then diluted with 30 mL of ultrapure water to measure the Si content.

5) N Content

The N content was measured by NSX analysis using a trace nitrogen analyzer (NSX-2100H). Specifically, the trace nitrogen analyzer (Autosampler, Horizontal furnace, PMT & Nitrogen detector) was turned on, carrier gas flow rates were set at 250 ml/min for Ar, 350 ml/min for 02, and 300 ml/min for an ozonizer, the heater was set at 800° C., and the analyzer was stabilized by waiting for about 3 hours. After the analyzer was stabilized, a calibration curve with a range of 5 ppm, 10 ppm, 50 ppm, 100 ppm, and 500 ppm was created using a nitrogen standard (AccuStandard S-22750-01-5 ml), an area corresponding to each concentration was obtained, and a straight line was then created using a ratio of the concentration to the area. Thereafter, a ceramic boat containing 20 mg of a sample was placed in the automatic sampler of the analyzer and an area was measured. An N content was calculated using the obtained area of the sample and the calibration curve.

6) Shrinking Factor (g')

After a sample was injected into a GPC-light scattering measurement apparatus (Viscotek TDAmax, Malvern Panalytical Ltd.) equipped with a light scattering detector and a viscosity detector to obtain an absolute molecular weight from the light scattering detector and obtain intrinsic viscosity [η] with respect to the absolute molecular weight from the light scattering detector and the viscosity detector, intrinsic viscosity $[\eta]_0$ of the linear polymer with respect to the absolute molecular weight was calculated by the following Equation 2, and an average value of ratios ($[\eta]/[\eta]_0$) of the intrinsic viscosities corresponding to each absolute molecular weight was expressed as the shrinking factor. In this case, a mixed solution of tetrahydrofuran and N,N,N',N'-tetramethylethylenediamine (adjusted by mixing 20 mL of N,N,N',N'-tetramethylethylenediamine with 1 L of tetrahydrofuran) was used as an eluent, PL Olexis (Agilent Technologies, Inc.) was used as a column, the measurement was made at an oven temperature of 40° C. and a THF flow rate of 1.0 mL/min, and the sample was prepared by dissolving 15 mg of a polymer in 10 mL of THF.

$$[\eta]_0 = 10^{-3.883} M^{0.771} \quad \text{[Equation 2]}$$

In Equation 2, M is the absolute molecular weight.

TABLE 1

| Category | | Examples | | | Comparative Examples | | | | | Reference Examples | |
|---|---|---|---|---|---|---|---|---|---|---|---|
| | | 1 | 2 | 3 | 1 | 2 | 3 | 4 | 5 | 1 | 2 |
| Reaction conditions | Modified monomer | M1 | M1 | M1 | M1 | — | — | M1 | M1 | M1 | M1 |
| | Modifier or coupling agent | F1 | F2 | F3 | F1 | — | F1 | C1 | F1 | F1 | F1 |
| | First reactor temperature (° C.) | 50 | 50 | 50 | 50→80 | 55 | 50 | 50 | 75 | 50→80 | 50→80 |
| | First reactor polymerization conversion rate (%) | 40 | 43 | 41 | — | 48 | 41 | 47 | 70 | — | — |
| NMR (wt %) | SM | 10 | 10 | 10 | 10 | 10 | 10 | 10 | 10 | 10 | 10 |
| | Vinyl | 38 | 38 | 38 | 38 | 38 | 38 | 38 | 38 | 38 | 38 |
| GPC | Mw (× 10³ g/mol) | 482 | 510 | 455 | 361 | 448 | 475 | 514 | 690 | 374 | 428 |
| | Mn (× 10³ g/mol) | 311 | 324 | 304 | 298 | 320 | 305 | 325 | 312 | 325 | 310 |
| | PDI | 1.55 | 1.57 | 1.50 | 1.21 | 1.40 | 1.56 | 1.58 | 2.21 | 1.15 | 1.38 |
| | C.N. | 1.21 | 1.80 | 1.90 | 1.40 | — | 1.21 | 2.90 | 1.19 | 1.00 | 2.00 |
| Molecular weight distribution curve | | Uni-modal | Uni-modal | Uni-modal | Bi-modal | Uni-modal | Uni-modal | Uni-modal | Uni-modal | Uni-modal | Uni-modal |
| Mooney viscosity (MV) | | 58 | 60 | 56 | 50 | 55 | 58 | 60 | 71 | 51 | 54 |
| Mooney stress-relaxation rate | | 1.0613 | 0.9299 | 0.8866 | 1.1346 | 0.8440 | 1.0077 | 0.4543 | 0.5440 | 1.3462 | 0.8172 |
| Shrinking factor (g') | | 1.112 | 1.010 | 0.959 | 1.214 | 0.918 | 1.101 | 0.449 | 0.512 | 1.417 | 0.908 |
| Si content (ppm) | | 155 | 291 | 303 | 91 | — | 153 | 20 | 90 | 120 | 79 |
| N content (ppm) | | 212 | 234 | 290 | 120 | — | 69 | 110 | 150 | 60 | 60 |

In Table 1, specific materials of the modified monomer, the modifier, and the coupling agent are as follows.

Modified monomer M1: 1-vinylimidazole

Modifier F1: 3-(dimethoxy(methyl)silyl)-N,N-diethylpropane-1-amine

Modifier F2: N,N-bis(3-(diethoxy(methyl)silyl)propyl)-1,1,1-trimethylsilamine

Modifier F3: N,N'-((1,1,3,3-tetramethoxydisiloxane-1,3-diyl)bis(propane-3,1-diyl))bis(1,1,1-trimethyl-N-(trimethylsilyl)silanamine)

Coupling agent C1: Dichlorodimethylsilane

As illustrated in Table 1, it may be confirmed that the modified conjugated diene-based polymers of Examples 1 to 3 according to the embodiment of the present invention had a PDI (molecular weight distribution) of 1.0 or more to less than 1.7, a Mooney stress-relaxation rate of 0.7 or more, and a shrinking factor of 0.8 or more while having a unimodal-shaped molecular weight distribution curve by gel permeation chromatography (see FIG. 1). In contrast, it may be confirmed that the unmodified or modified conjugated diene-based polymers of Comparative Examples 1 to 5 and Reference Examples 1 and 2 had a bimodal-shaped molecular weight distribution curve by gel permeation chromatography (see FIG. 2) or had a Mooney stress-relaxation rate of less than 0.7, and a shrinking factor of less than 0.8, and, particularly, with respect to Comparative Example 5 which was prepared by continuous polymerization, but the polymerization conversion rate in the first reactor was outside the range of the present invention, a PDI value was greater than 1.7, and a Mooney stress-relaxation rate and a shrinking factor were less than 0.7 and less than 0.8, respectively, wherein it may be confirmed that these values were significantly reduced in comparison to those of the examples.

Figure 2:
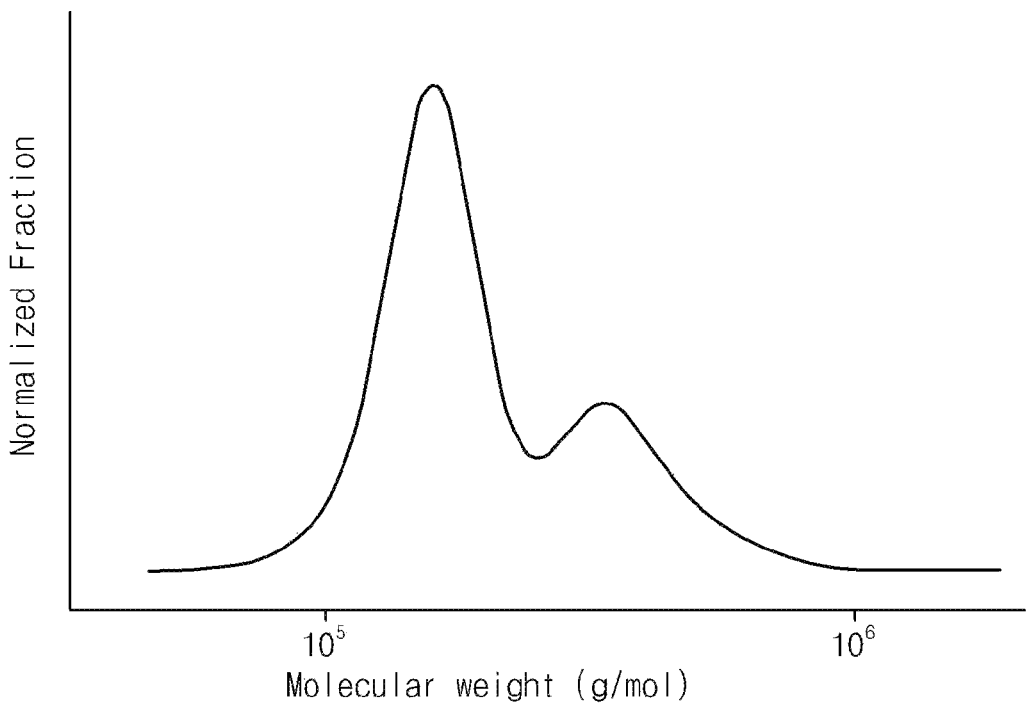
FIG. 2 illustrates a molecular weight distribution curve of a modified conjugated diene-based polymer of Comparative Example 1 according to an embodiment of the present invention by gel permeation chromatography (GPC)
Figure 3:
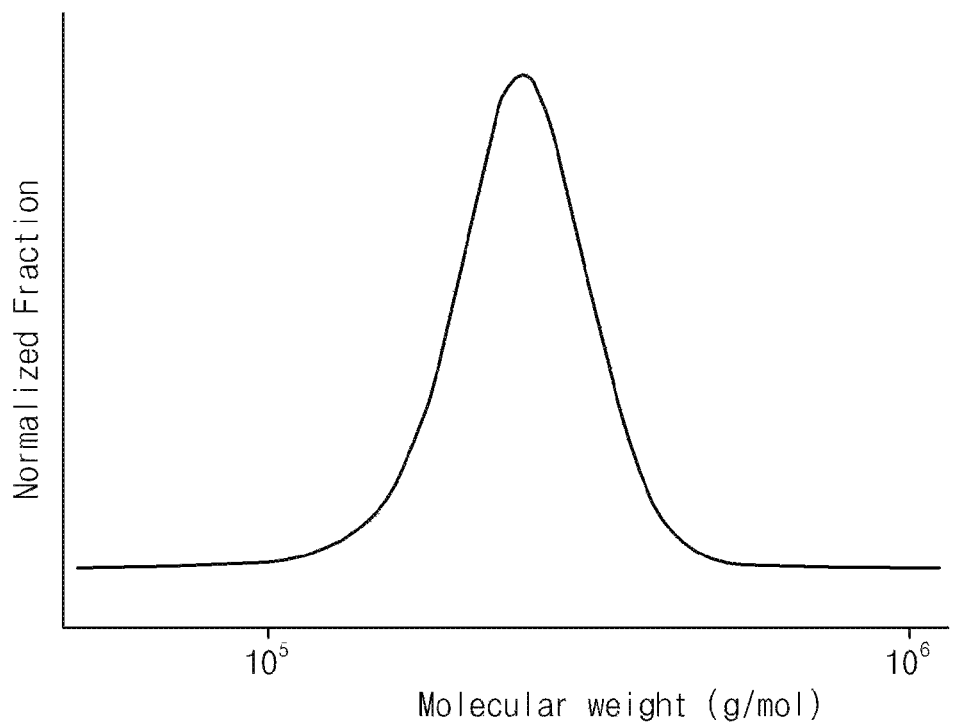
FIG. 3 illustrates a molecular weight distribution curve of a modified conjugated diene-based polymer of Reference Example 1 according to an embodiment of the present invention by gel permeation chromatography (GPC)
Figure 4:
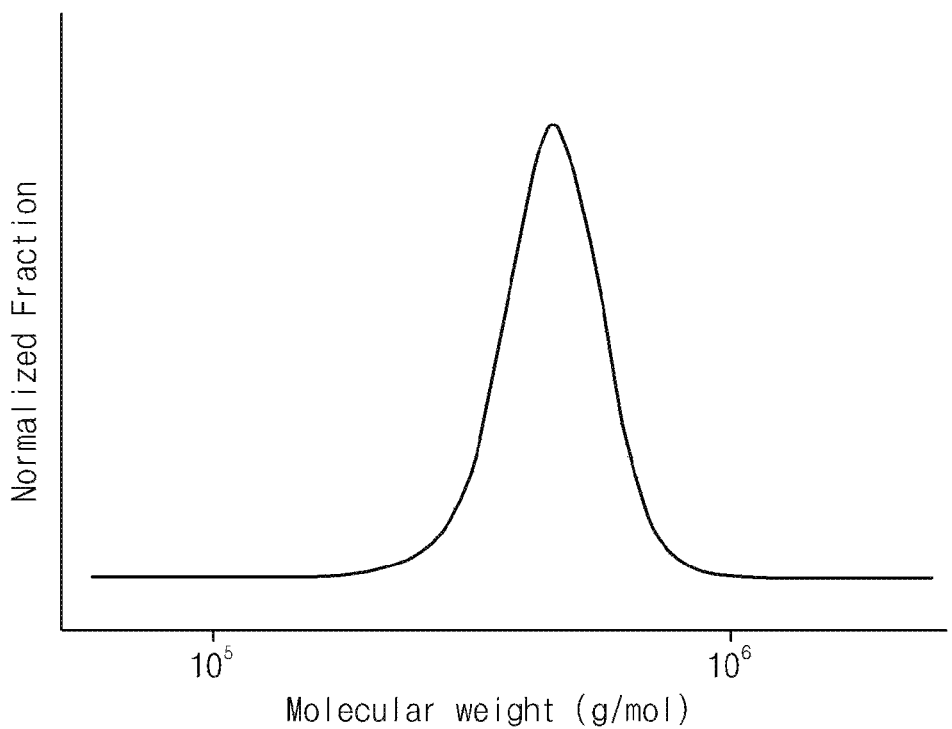
FIG. 4 illustrates a molecular weight distribution curve of a modified conjugated diene-based polymer of Reference Example 2 according to an embodiment of the present invention by gel permeation chromatography (GPC).

Also, with respect to Comparative Example 1 in which the polymer was prepared by the batch polymerization method of the present invention, the molecular weight distribution curve by gel permeation chromatography had a bimodal shape (see FIG. 2). Even though the batch polymerization method is used as in Reference Examples 1 and 2, the molecular weight distribution curves may be adjusted to have a unimodal shape (see FIGS. 3 and 4), but, in this case, each of the coupling numbers of the polymers was 1.0 or 2.0, wherein, since only the polymer, in which all of the polymer was not coupled by the modifier (Reference Example 1), and the polymer, in which most of the polymer was coupled by the modifier (Reference Example 2), may be present, there was a difference in the structure and properties from the unimodal polymer according to the continuous polymerization method of the present invention, and thus, it may be confirmed that processability, tensile properties, and viscoelastic properties were significantly reduced in comparison to those of the examples as illustrated in Table 3 to be described later.

The modified conjugated diene-based polymers of Comparative Examples 3 and 4 were prepared at the same level as the examples according to the present invention except for the type of the modifier and whether or not the modified monomer was used during the polymerization, wherein polymer physical properties, such as molecular weight distribution, coupling number, Mooney stress-relaxation rate, and shrinking factor, showed similar levels to those of the examples, but, since the modified monomer- or modifier-derived functional group suggested in the present invention was not included, the affinity with the filler was poor, which may be confirmed by the fact that tensile properties and viscoelastic properties of Comparative Examples 3 and 4 in Table 3 to be described later were significantly reduced in comparison to those of the examples.

Experimental Example 2

In order to comparatively analyze physical properties of rubber compositions including each of the modified or unmodified conjugated diene-based polymers prepared in the examples, the comparative examples, and the reference examples and molded articles prepared therefrom, tensile properties and viscoelastic properties were respectively measured, and the results thereof are presented in Table 3 below.

1) Preparation of Rubber Samples

Each of the modified or unmodified conjugated diene-based polymers of the examples and comparative example was used as a raw material rubber and was mixed under mixing conditions shown in Table 2 below. An amount of each raw material in Table 2 was represented by parts by weight based on 100 parts by weight of the rubber.

TABLE 2

| Category | Raw material | Amount (parts by weight) |
|---|---|---|
| First stage kneading | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Anti-aging agent | 2 |
| | Wax | 1 |
| Second stage kneading | Sulfur | 1.5 |
| | Rubber accelerator | 1.75 |
| | Vulcanization accelerator | 2 |

Specifically, the rubber samples were kneaded through first stage kneading and second stage kneading. In the first stage kneading, the raw material rubber, silica (filler), organosilane coupling agent (X50S, Evonik), process oil (TDAE oil), zinc white (ZnO), stearic acid, antioxidant (TMQ(RD) (2,2,4-trimethyl-1,2-dihydroquinoline polymer), anti-aging agent (6PPD((dimethylbutyl)-N-phenyl-phenylenediamine), and wax (microcrystalline wax) were kneaded using a Banbury mixer equipped with a temperature control device. In this case, an initial temperature of the mixer was controlled to be 70° C. and, after the completion of the mixing, a primary formulation was obtained at a discharge temperature of 145° C. to 155° C. In the second stage kneading, after the primary formulation was cooled to room temperature, the primary formulation, sulfur, a rubber accelerator (DPD(diphenylguanine)), and a vulcanization accelerator (CZ(N-cyclohexyl-2-benzothiazyl sulfonamide) were added to the mixer and mixed at a temperature of 100° C. or less to obtain a secondary formulation. Thereafter, a curing process was performed at 160° C. for 20 minutes to prepare each rubber sample.

2) Tensile Properties

Each specimen was prepared according to the tensile test method of ASTM 412, and tensile strength at break of the specimen and tensile stress at 300% elongation (300% modulus) were measured for tensile properties. Specifically, the tensile properties were measured at a rate of 50 cm/min at room temperature using a tensile testing machine, a Universal Test Machine 4204 (Instron).

3) Viscoelastic Properties

With respect to viscoelastic properties, tan δ was confirmed by measuring viscoelastic behavior for dynamic deformation at each measurement temperature (−60° C. to 60° C.) and a frequency of 10 Hz in a film tension mode using a dynamic mechanical analyzer (GABO Qualimeter Testanlagen GmbH). In the measurement values, the higher the tan δ at a low temperature of 0° C. was, the better the wet road surface resistance was, and the lower the tan δ at a high temperature of 60° C. was, the lower the hysteresis loss was and the better the low running resistance (fuel economy) was, but, in Table 3, since the viscoelastic properties were expressed by indexing (%) after specifying a reference value, the higher the value was, the better the viscoelastic properties were.

4) Processability Characteristics

The Mooney viscosity (MV, (ML1+4, @100° C.) MU) of the secondary formulation obtained in 1) Preparation of Rubber Samples was measured to comparatively analyze processability characteristics of each polymer, and, in this case, the lower the Mooney viscosity measurement value was, the better the processability characteristics were.

Specifically, the Mooney viscosity was measured with a large rotor at a rotor speed of 2±0.02 rpm at 100° C. using MV-2000 (ALPHA Technologies). After each secondary formulation was left standing for 30 minutes or more at room temperature (23±3° C.), 27±3 g of each sample was taken and filled into a die cavity, and the Mooney viscosity was measured for 4 minutes by operating a platen.

TABLE 3

| | | Examples | | | Comparative Examples | | | | | Reference Examples | |
|---|---|---|---|---|---|---|---|---|---|---|---|
| Category | | 1 | 2 | 3 | 1 | 2 | 3 | 4 | 5 | 1 | 2 |
| Tensile properties | Tensile strength (kgf/cm$^2$) | 160 | 165 | 161 | 160 | 160 | 158 | 165 | 155 | 154 | 150 |
| | 300% modulus (kgf/cm$^2$) | 109 | 111 | 115 | 108 | 83 | 95 | 89 | 99 | 87 | 92 |
| Viscoelastic properties (INDEX) | tan δ (at 0° C.) | 101 | 103 | 103 | 100 | 100 | 101 | 98 | 99 | 100 | 99 |
| | tan δ (at 60° C.) | 131 | 130 | 135 | 119 | 100 | 113 | 103 | 118 | 110 | 105 |
| Processability characteristics | | 79 | 78 | 81 | 90 | 69 | 80 | 78 | 92 | 100 | 95 |

In Table 3, resulting values of viscoelastic properties of Examples 1 to 3, Comparative Example 1, Comparative Examples 3 to 5, and Reference Examples 1 and 2 were expressed as indices (%) based on the measurement value of Comparative Example 2.

As illustrated in Table 3, with respect to Examples 1 to 3 according to the embodiment of the present invention, tensile properties, viscoelastic properties, and processability characteristics were improved in comparison to those of Comparative Examples 1 to 5 and Reference Examples 1 and 2.

In viscoelastic properties, it is known that it is generally very difficult to have properties in which a tan δ value at 60° C. is improved at the same time while a tan δ value at 0° C. is improved. Thus, it may be understood that the viscoelastic properties of Examples 1 to 3, in which tan δ values at 60° C. were significantly improved at the same time while tan δ values at 0° C. were at levels equal to or higher than those of the comparative examples, were excellent.

Also, as illustrated in Table 3, with respect to Reference Examples 1 and 2 which were prepared by batch polymerization but had a unimodal-shaped molecular weight distribution curve, poor processability inherent to the batch polymerization was not only not improved, but mixing properties, such as tensile properties and viscoelastic properties, realized by conventional batch polymerization were also significantly poorer than those of the examples. Herein, the poor processability inherent to the batch polymerization may be confirmed by the results of Comparative Example 1 having a bimodal molecular weight distribution curve which was prepared by the conventional batch polymerization.

The invention claimed is:

1. A modified conjugated diene-based polymer, comprising:
a modified monomer-derived functional group represented by Formula 2; and
an aminoalkoxysilane-based modifier-derived functional group at least one end thereof:

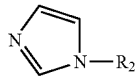

[Formula 2]

wherein, in Formula 2,
$R_2$ is an alkenyl group having 2 to 10 carbon atoms,
wherein the polymer having a unimodal molecular weight distribution, and a polydispersity index (PDI) of 1.0 or more to less than 1.7, and
wherein a coupling number (C.N.) of the modified conjugated diene-based polymer satisfies 1<C.N.<F, wherein F is the number of functional groups of the aminoalkyoxysilane-based modifier and wherein F is 2,
wherein the aminoalkoxysilane-based modifier comprises at least one selected from compounds represented by Formulae 4 and 5:

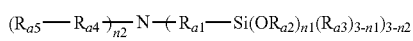

[Formula 4]

wherein, in Formula 4,
$R_{a1}$ and $R_{a4}$ are each independently a single bond or an alkylene group having 1 to 10 carbon atoms,
$R_{a2}$ and $R_{a3}$ are each independently an alkyl group having 1 to 10 carbon atoms,
$R_{a5}$ is a hydrogen atom, an alkyl group having 1 to 10 carbon atoms, or a divalent, trivalent, or tetravalent alkylsilyl group substituted with an alkyl group having 1 to 10 carbon atoms,
n1 is an integer of 1 to 3, and
n2 is an integer of 0 to 2,

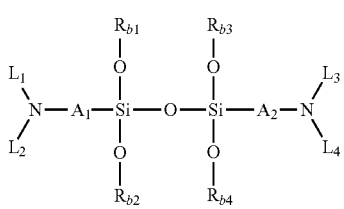

[Formula 5]

wherein, in Formula 5,
$A_1$ and $A_2$ are each independently an alkylene group having 1 to 20 carbon atoms,
$R_{b1}$ to $R_{b4}$ are each independently an alkyl group having 1 to 20 carbon atoms, and
$L_1$ to $L_4$ are each independently an alkyl group having 1 to 20 carbon atoms, an aryl group having 6 to 20 carbon atoms, or a divalent, trivalent or tetravalent alkylsilyl group substituted with an alkyl group having 1 to 10 carbon atoms.

2. The modified conjugated diene-based polymer of claim 1, wherein the modified monomer represented by Formula 2 is a compound represented by Formula 3:

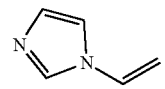

[Formula 3]

3. The modified conjugated diene-based polymer of claim 1, wherein, in Formula 4, $R_{a1}$ and $R_{a4}$ are each independently a single bond or an alkylene group having 1 to 5 carbon atoms,
$R_{a2}$ and $R_{a3}$ are each independently an alkyl group having 1 to 5 carbon atoms, and
$R_{a5}$ is a hydrogen atom, an alkyl group having 1 to 5 carbon atoms, or a tetravalent alkylsilyl group substituted with an alkyl group having 1 to 5 carbon atoms.

4. The modified conjugated diene-based polymer of claim 1, wherein, in Formula 5, $A_1$ and $A_2$ are each independently an alkylene group having 1 to 10 carbon atoms,
$R_{b1}$ to $R_{b4}$ are each independently an alkyl group having 1 to 10 carbon atoms, and
$L_1$ to $L_4$ are each independently an alkyl group having 1 to 10 carbon atoms, an aryl group having 6 to 12 carbon atoms, or a tetravalent alkylsilyl group substituted with an alkyl group having 1 to 5 carbon atoms.

5. The modified conjugated diene-based polymer of claim 1, wherein the modified conjugated diene-based polymer has a number-average molecular weight (Mn) of 1,000 g/mol to 2,000,000 g/mol, a weight-average molecular weight (Mw) of 1,000 g/mol to 3,000,000 g/mol, and a peak-average molecular weight (Mp) of 1,000 g/mol to 3,000,000 g/mol.

6. The modified conjugated diene-based polymer of claim 1, wherein each of a silicon (Si) content and a nitrogen (N) content of the modified conjugated diene-based polymer is 50 ppm or more based on a weight of the modified conjugated diene-based polymer.

7. The modified conjugated diene-based polymer of claim 1, wherein the modified conjugated diene-based polymer has a Mooney stress-relaxation rate of 0.7 or more to 3.0 or less when measured at 100° C.

8. The modified conjugated diene-based polymer of claim 1, wherein the modified conjugated diene-based polymer has a shrinking factor of 0.8 to 3.0, the shrinking factor being an average value of a ratio ($[\Theta]/[\eta]0$) of intrinsic viscosity ($[\eta]$) of the polymer at an absolute molecular weight to the intrinsic viscosity ($[\eta]0$) of a linear polymer at the absolute molecular weight.

9. A rubber composition, comprising:
the modified conjugated diene-based polymer of claim 1; and a filler.

10. The rubber composition of claim 9, wherein the rubber composition comprises 0.1 part by weight to 200 parts by weight of the filler based on 100 parts by weight of the modified conjugated diene-based polymer.

11. The rubber composition of claim 9, wherein the filler is a silica-based filler or a carbon black-based filler.

\* \* \* \* \*